วันที่ 21 พฤษภาคม 1996

US005518664A

United States Patent [19]
Reitz

[11] Patent Number: 5,518,664
[45] Date of Patent: *May 21, 1996

[54] PROGRAMMABLE ELECTROSET PROCESSES

[75] Inventor: Ronald P. Reitz, Hyattsville, Md.

[73] Assignee: The United States of America as represented by the Secretary of the Navy, Washington, D.C.

[*] Notice: The term of this patent shall not extend beyond the expiration date of Pat. No. 5,194,181.

[21] Appl. No.: 311,632

[22] Filed: Sep. 23, 1994

Related U.S. Application Data

[62] Division of Ser. No. 810,548, Dec. 19, 1991, which is a continuation of Ser. No. 584,836, Sep. 19, 1990, abandoned, which is a continuation-in-part of Ser. No. 219,522, Jul. 15, 1988, and a continuation-in-part of Ser. No. 219,523, Jul. 15, 1988, abandoned, and a continuation-in-part of Ser. No. 405,178, Sep. 11, 1989, Pat. No. 5,194,181.

[51] Int. Cl.$^6$ .............. H01B 1/20; B29C 67/00; B29C 35/02; B29C 39/00
[52] U.S. Cl. .............. 252/518; 252/500; 252/511; 252/512; 252/572; 252/62.9 R; 219/770; 264/402
[58] Field of Search .............. 252/500, 511, 252/512, 518, 572, 73, 74, 62.9; 264/22, 24, 25, 26; 219/770; 427/543, 544, 540

[56] References Cited

U.S. PATENT DOCUMENTS

| | | | |
|---|---|---|---|
| 4,301,187 | 11/1981 | Burch | 427/540 |
| 4,407,054 | 10/1983 | Zipfel | 252/62.9 X |
| 4,423,191 | 12/1983 | Haven et al. | 264/26 X |
| 4,441,875 | 4/1984 | Saito et al. | 264/24 X |
| 4,707,231 | 11/1987 | Berger | 264/24 X |
| 4,826,616 | 5/1989 | Tanino et al. | 252/62.9 |
| 4,857,244 | 8/1989 | Berger | 264/24 |
| 4,900,387 | 2/1990 | Johnson | 427/543 X |
| 4,921,928 | 5/1990 | Tanino et al. | 252/62.9 X |
| 5,190,624 | 3/1993 | Reitz | 252/62.9 X |
| 5,194,181 | 3/1993 | Reitz | 252/73 X |
| 5,213,713 | 5/1993 | Reitz | 252/73 X |
| 5,232,639 | 8/1993 | Reitz et al. | 264/24 X |
| 5,279,870 | 1/1994 | Kester | 264/22 X |

OTHER PUBLICATIONS

Grant & Hackh's *Chemical Dictionary*, 5th ed., McGraw–Hill Book Company, 1987, p. 524.

Tottle, C. R., *An Encyclopedia of Metallurgy and Materials*, Macdonald and Evans, 1984, xviii.

*Primary Examiner*—Douglas J. McGinty
*Attorney, Agent, or Firm*—Howard Kaiser

[57] ABSTRACT

The present invention comprises improved electroset materials and processes. Electroset materials with electrically programmable electric and mechanical properties comprise electrically polarizable particles immersed within the suspended within castable dielectric fluids. The polarizable particles may comprise ions or, alternatively, electrically conductive or semiconductive particles.

18 Claims, 4 Drawing Sheets

PROGRAMMABLE ELECTROSET PROCESSES

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This application is a division of my copending patent application Ser. No. 07/810,548 filed Dec. 19, 1991, which is a continuation of my copending patent application Ser. No. 07/584,836 filed Sep. 19, 1990, now abandoned, which is a continuation-in-part of my copending patent application Ser. No. 07/219,522 filed Jul. 15, 1988 and a continuation-in-part of my copending patent application Ser. No. 07/219,523 filed Jul. 15, 1988, now abandoned and a continuation-in-part of my copending patent application Ser. No. 07/405,178 filed Sep. 11, 1989, U.S. Pat. No. 5,194,181.

BACKGROUND OF THE INVENTION

1. Field of the Invention

This invention relates to the field of composition of materials and articles that have one or more properties of the composition or article electrically induced and more particularly to such properties as they may be induced electrostatically.

2. Background Information

The invention disclosed herein is a continuation-in-part of work previously accomplished and for which copending patent applications were filed on Jul. 15, 1988 as Ser. Nos. 07/219,522 entitled Induced Dipole Electroviscous Fluids and 07/219,523 entitled Photoelectroviscous Fluids, and on Sep. 11, 1989 as Ser. No. 07/405,178, Electroset Compositions and Articles, the disclosures of which are hereby incorporated by reference. In particular, my earlier copending applications have disclosed electroviscous fluids and aggregates useful in electroviscous fluids. My later copending application disclosed a series of compounds utilizing in part aggregates as disclosed in my earlier copending applications. The term aggregate is used in the collective to include a multiplicity of polarizable aggregate particles. In copending applications, the term electroviscous aggregate has been used to describe an aggregate which, when placed in a dielectric liquid, causes the combination of fluid and aggregate to behave electroviscously. In the present application, the term electrorheological aggregate is used in similar manner.

SUMMARY OF THE INVENTION

Electroset materials, in accordance with the present invention, comprise, castable fluid compounds such as, for example, fluid polymers and ceramics that can be caused to set and cure electrically or wherein the set and cure rate is electrically controllable. The present invention comprises electroset material that have electrically controllable end product properties. These electrically controllable end product properties include physical, structural properties, electrical properties and the end-product shape.

In my copending patent application Ser. No. 07/405,178, a class of materials identified as electroset compositions was disclosed. In that application, the electroset compound was disclosed comprising a a phase changing vehicle (i.e. a castable material) and an electrorheological aggregate suitable for making the phase changing fluid electroviscous. At the time of filing the copending patent application Ser. No. 07/405,178, it was believed that the sole effect of applying an electric field to the electroset compound was to accelerate the cure of a compound that would otherwise cure in its normal mode of application without benefit of any specific acceleration mechanism.

It has since been determined that the physical characteristics such as for example density and specific gravity of certain electroset compounds are susceptible to influence by an applied electric field during the cure time of the material. Two part epoxy type compounds which cure by exothermic reaction are especially useful as the phase changing vehicle. Further, it has been determined that the density of the cured material may either be isotropic or anisotropic. Isotropic density means that the incremental density of the cured material remains about the same through out the volume of the cured material. Anisotropic density means that the incremental density of the cured material has readily observable different values at different parts of the volume of the cured material.

Herein the term electroshaped materials shall refer to the materials comprising any object deriving its shape, at least in part, from the application of an electric field to those materials. Thus, while it is cooling and undergoing a phase change from fluid to solid, a thermoplastic material or other phase changing vehicle with electrorheological aggregate dispersed therein can derive its shape by means of its immersion in an electric field. Materials made in accordance with the present invention have controllably different physical end product properties. In this disclosure, the term "end product properties" refers to those properties of the material after the material has fully cured. The end product properties of the present invention can be made relatively homogenous throughout the electroset material, or alternatively, anisotropic.

The present invention is useful and advantageous in the fabrication of polymeric articles. One such article that may be advantageously manufactured using the compositions and processes of the present invention is shoe soles and portions of shoe soles. In accordance with the present invention, shoe soles are fabricated with a great variety of chosen compressibilities. Applying an electric field to properly formulated electroset material shaped in the form of a shoe sole while the electroset material is undergoing phase change from fluid to solid, will not only accelerate the cure of the sole but will alter the overall compressibility of the resultant sole. Changing the applied electric field alters the obtained compressibility of the sole. Also by selective application of field strength to various parts of the sole, the compressibility of some portions of the sole are made selectively different from other parts of the sole.

The present invention provides an advantageous means of altering the properties of a fabricated shoe sole not found in the prior art. In prior art manufacturing of castable polymer shoe soles required that the formulation of the castable polymer be changed in order to significantly change the shoe sole compressibility. Such a change in formulation requires the time consuming and messy Job of recalculating the proportions of polymer constituents to be mixed, measuring out these new proportions of polymer constituent materials and then mixing. Often, the newly reformulated polymer is incompatible with the constituents of the prior polymer. This necessitates care to ensure that the prior polymer constituents and those of the new polymer are not accidently mixed together.

The materials of the present invention, on the other hand, do not need to be reformulated in order to yield changes in the desired properties of the shoe soles. Merely changing the applied electric field accomplishes this purpose. There is no need for recalculating the proportions of the polymer constituents. Furthermore, there is less likelihood in mixing constituents that should not be mixed together. Furthermore, this time consuming process is eliminated.

It is therefore an object of the invention to provide materials that can be electrically shaped.

It is another object of the invention to provide means whereby the end product properties of electroset materials can be controllably and electrically altered.

It is yet another object of the invention to provide a means of electrically providing anisotropy in the end product properties of an electroset material.

It is another object of the invention to provide electroset materials with electrically controlled end product properties.

It is yet another object of the invention to provide electroset materials with electrically controllable anisotropic end product properties.

It is still yet another object of the invention to provide electrically controlled means for foaming an electroset material.

It is still further another object of the invention to provide a means for anisotropically foaming an electroset material.

It is still yet further another object of the invention to provide means whereby the anisotropic foaming of the soles of shoes is accomplished.

It is finally another object of the invention to provide a means whereby the properties of soles of shoes derived from polymers can be quickly and controllably altered during their fabrication.

These and other objects, features and advantages of the present invention will become apparent from a consideration of the following detailed description and examples presented in connection with the accompanying drawings in which:

DESCRIPTION OF THE PREFERRED EMBODIMENTS

Several electroset materials were fabricated and tested to determine their end-product physical properties. During the process of electrosetting the materials, a Glassman 30 kilovolt (kv), 50 milliamp (ma) high voltage power supply, Model PS/PH030P050, serial 49470 Master/slave/AHV was used to energize the electroset material fluid. This power supply has the convenient features of both a tunable current limiter dial, which limits the maximum allowable output current and a tunable voltage limiter dial, which limits the maximum allowable output voltage. Each dial also has an adjacent corresponding milliamp meter and kilovolt meter, respectively. Hereinafter, unless otherwise specified, this supply was used in all tests of sample materials in accordance with the various examples.

The sampling probes used in examples 1 and 2 comprise two electrode plates, similar to those mentioned my copending patent applications Ser. Nos. 07/219,522 and 07/219,523, with dimensions of about 1.0 in.×1.5 in. (2.5 cm×3.8 cm) and made of aluminum. The electrode plates were separated by a wooden strip about one inch (2.5 cm) wide and 0.2 in. (0.5 cm) thick and secured to the wooden strip by tape leaving a portion of the aluminum electrodes extending about one inch (about 2.5 cm) beyond the wooden strip in an approximately parallel relationship. An electrical wire was conductively attached to each of the electrodes and one wire connected to the positive polarity and one wire connected to the negative polarity of the high voltage power supply. When electrosetting the following example materials, the electrodes were immersed into the electroset material while the material was in a fluid state and then the electrodes were energized.

Example 1

Fifty (50) ml of polyester resin, sold under the Marineyard Resin brand name and produced by Kardol in Miami, Fla., was mixed in a glass beaker with 50 ml edible cornstarch and one ml of an acrylic floor finish marketed under the brand name Giant by Giant, Inc., Landover, Md. When this mixture appeared fairly homogeneous to the eye, 15 drops of a curing agent, Liquid Hardener Reactor, comprising methyl ethyl ketone peroxide in dimethyl phthalate (MEKP) were added to the mixture and again mixed well for about 1 minute. The sampling probe was then immersed into the mixture. The power supply voltage and current dials were used to set the maximum allowable voltage to 3 kv and the maximum allowable current to 5 ma per square inch area of electrode surface area. After several minutes of immersion in the mixture under these conditions, the mixture between the electrodes was found to have hardened. This sample was then measured for its overall density using a weighing scale and the Archimedes method of density measurement.

Other samples of the Example 1 mixture were also mixed and tested in a similar manner as the first sample. The same experimental conditions were held for these samples as those in the first sample fabrication except for the maximum allowable current. In each case of sample fabrication, the maximum allowable current was varied from all previous samples. After separation from the electrodes, each sample was measured for its density. The results obtained are given in table 1.

TABLE 1

PHYSICAL PROPERTIES V. S. MAXIMUM ALLOWED CURRENT AT 3 KV MAX VOLTAGE

| Sample Number | Maximum Allowed Current | | Specific Gravity | Measured Hardness |
|---|---|---|---|---|
| | ma/in.$^2$ | ma/cm$^2$ | g/cc | Shore 'D' |
| 1 | 5.0 | 0.787 | 0.852 | 55 |
| 2 | 4.0 | 0.629 | 0.925 | 60 |
| 3 | 3.33 | 0.524 | 0.967 | 63 |
| 4 | 2.0 | 0.496 | 1.110 | 72 |
| 5 | 1.33 | 0.314 | 1.150 | 76 |
| 6 | 0.667 | 0.209 | 1.190 | 82 |
| 7 | 0.000 | 0.000 | 1.280 | 82 |

Example 1

The data for samples 1–7 of example 1 clearly demonstrate the variance in the end product property of density. These density variations are clearly a function of the amount of electric current permitted to pass through the samples at the 3 kV potential. These tests were repeated several times and equivalent results were obtained each time, clearly demonstrating the ability to electrically program into the example 1 electroset material a desired density within a range of values.

Although the reasons for this effect are not clearly understood, it is known that the polyester resin and MEKP, when mixed in adequate quantities, hardens by means of exothermic reaction. When no voltage is applied to this material, solidification requires about 30 minutes. However, when an electric field is applied to this material the time required for the material to solidify is reduced. This reduction in time is proportional to the maximum permissible current such that the first sample solidified much faster than any of the others. It was also noted that the samples had taken on in solid form the shape of the volume between the electrodes. In this case, the end product samples were all rectangular blocks. The probe thus constituted a rectangular electroset mold.

After the density measurements shown in Table 1 were obtained, the samples were cut open and examined. A number of voids was found within the less dense samples. Numerous voids were observed within the least dense sample while none were found within the most dense sample. The amount of observable voids within the samples varied as a function of sample density, so that, for example, the amounts found within samples 3 and 4 were less than those of sample 1 and more those found in sample 6. Sample 7, it was observed, had no discernable void embedded within it.

As disclosed in my copending patent application Ser. No. 07/405,178, entitled Electroset Composition and Articles, the second Reitz effect, also called the electroset phenomenon, accelerates the curing rate. This forces the curing exothermic reaction of the mixture in example 1 to occur over a shorter time period. Since the polyester resin is a poor thermal conductor, the heat within the material builds up or increases because the exothermic reaction is taking place over a shorter period of time. Although not wishing to be bound by theory, it is possible that the one cause of cure acceleration in such exothermic electroset materials may be due to heating from the passage of current through the aggregate particles. The aggregate particles, when energized, often form themselves into a chain of aggregate particles that bridge the gap between the electrodes. The alignment of these particles along the electric line of flux can permit electric current to pass through the chain. This passage of electric current can, in turn, cause heating. Such heating from the passage of current through conductors and semiconductors is described by the well-known Poynting vector in electromagnetism. Poynting's vector and the heating related thereto are discussed in Foundations of Electromagnetic Theory, written by Reitz, Milford and Christy, 3rd edition and published by Addison-Wesley Publishing Co. in Reading, Mass.

An increase in heat could, at least in part, be responsible for voids found in the samples. It is expected that either the latent water found in edible corn starch or alternately a constituent of the fluid comprising the Giant acrylic floor finish would undergo a phase change from fluid to gaseous state when at a sufficient temperature and suitable pressure. Such a phase change is normally brought about by heating such fluids to their phase change temperature for the existing pressure. At this temperature, the fluid begins to undergo phase change until all of the fluid becomes gaseous. If, however, during the time that this phase change is occurring, the bulk polymer, which in example 1 is the polyester resin with MEKP, is solidifying, then the gas bubbles within the bulk polymer become trapped, thus causing voids to form in cured material. If the bulk polymer solidifies before all or even most of the available water in the cornstarch has changed from liquid to gas, then the rest of the water in the cornstarch is trapped into the solidifying polymer.

The number of voids formed within the material is then a function not only of the temperature of the bulk material and the availability of phase changing material within, but also is a function of how far along in the process of solidification the bulk material is. As the bulk material progresses along in its solidification process, its viscosity increases, making it progressively more difficult for the gas bubbles to escape.

Escaping gas bubbles were observed initially as the bulk material of example 1 began to solidity. This ceased after the material of example 1 had completely electroset.

Another origin of the voids is also possible. It has been observed in association with Electroviscous Fluids (EV) that sometimes, when near to or in contact with the charged electrodes, aggregate particles become charged with the same charge as the proximate electrode, resulting in the aggregate particle traversing the EV fluid between the electrodes and colliding with the opposite electrode. The aggregate particle then becomes charged with the charge of the opposite electrode and traverses the fluid again toward the first electrode. This back and forth motion is often repeated by this same aggregate particle. This motion of a charged aggregate particle through the viscous fluid is expected to cause heat to be generated. Such heating may increase the curing rate of electroset materials that cure normally by exothermic reaction. Particle motion may also result in better mixing of the constituent materials in an electroset material and may cause the voids in the electroset material by cavitation or other like means.

It is not yet apparent which, if any, of the above postulated theories may be correct in explaining the presence of increased heating in the curing material or voids in the cured material. The phenomenon may be better explainable by some yet to be postulated theory. What is known is that the electrosetting with included voids occurs as a function of electrical current flow through the curing material and the passage of current causes the release of a gas or vapor useful as a blowing agent to cause the voids.

Regardless of the reason the foaming or bubbling occurred, it was observed. The amount of observed foaming and the amount of voids later found in the samples was indeed electrically controlled. Thus, example 1 provides an example of a material with electrically activated and electrically controlled foaming in an electroset material.

Before each of the samples of example 1 was examined for the presence of voids, its property of material hardness was measured. Measurements of material hardness were performed with a Rex Durometer instrument, type 'D' model standard dial which is produced by the Rex Gauge Co. in Glenview Ill. This gauge bears U.S. Pat. No. 2,421,449 and was used in compliance with standard hardness measurement practices. The measured hardness of samples are also shown in Table 1. The hardness number shown is the average of 10 measurements for each sample.

The data of table 1 shows that the overall end product hardness of the electroset material in example 1 is an inverse function of applied electric power. The more electric power applied to this electroset material during its cure, the lower the end product hardness.

Conclusions drawn from the data of example 1 clearly demonstrate that the formulation disclosed in example 1 has electrically controllable end product properties. Both sample density and hardness were found to be electrically controlled.

It was also found samples 1 and 7 made in example 1 had electrical resistance across the electrodes of greater than 20 megohms. This was accomplished by disconnecting the probe from the high voltage power supply and electrically connecting it to an ohm-meter. For the purposes of this measurement, a Fluke 8026B multimeter was used. However, Just after mixing and before the high voltage was applied, the same multimeter was used to measure the material electrical resistance. It was found that the formulation in the initial fluid state, that is to say the state just after mixing, had a resistance of less than 10 megohms across the probe electrode gap. This is important because sample 1 solidified in less than 4 minutes whereas sample 7 required slightly over 30 minutes for solidification. This indicates that, after fabrication of the electroset material, its electrical properties are electrically controllable as well. Such controllable electrical properties may be useful in expendable electrical systems where electrical resistance can act as a triggering mechanism.

Example 2

Another material comprising an epoxy with the brand name Two Ton Epoxy and manufactured by the Devcon Corp., was purchased at a local hobby shop. This Two Ton Epoxy is a two part epoxy comprising a resin and a hardener. Normal working time, the so-called pot life, is about 30 minutes for this material after equivalent parts of resin and hardener are mixed. A 25 ml quantity of the resin was mixed with 30 ml of cornstarch and 3 ml of Giant brand acrylic floor finish. This was then mixed with a 25 ml quantity of the Two Ton Epoxy hardener. After mixing by hand for approximately 1 minute, an electrode probe as described above was immersed in the mixture. The maximum output voltage of the high voltage power supply was set to 3 kv and the maximum current output was set at 5 ma.

After several minutes it was observed that the material between the probe electrodes had electroset into a solid. The probe was removed and replaced by another clean probe of the same type and dimensions. Two other samples were taken, under the same conditions the first except that the maximum applied current was changed to 2.5 ma and 0.0 ma, respectively. The resulting samples were weighed and their densities calculated from their volume. The density results are shown in Table 2.

TABLE 2

| | MEASURED DENSITY | | |
| --- | --- | --- | --- |
| | Maximum Current | | Specific Gravity |
| Sample number | ma/in² | ma/cm² | (g/cc) |
| 1 | 5.0 | 0.78 | 0.94 |
| 2 | 2.5 | 0.39 | 1.06 |
| 3 | 0.0 | 0.00 | 1.15 |

Example 2

As with the samples of example 1, the samples of example 2 were broken apart after density was determined. As in example 1, the samples of example 2 that were electroset had observable voids in them. Furthermore, sample 1 electroset with 5.0 ma/in² maximum current had significantly higher amounts of observable voids than the others. Sample 3 had no observable voids while sample 2 had a number of the voids. Both the visible inspection and the density data for the formulation of Example 2 again indicate the electrical programmability and electrical control of the end product properties.

Example 3

Figure 1:
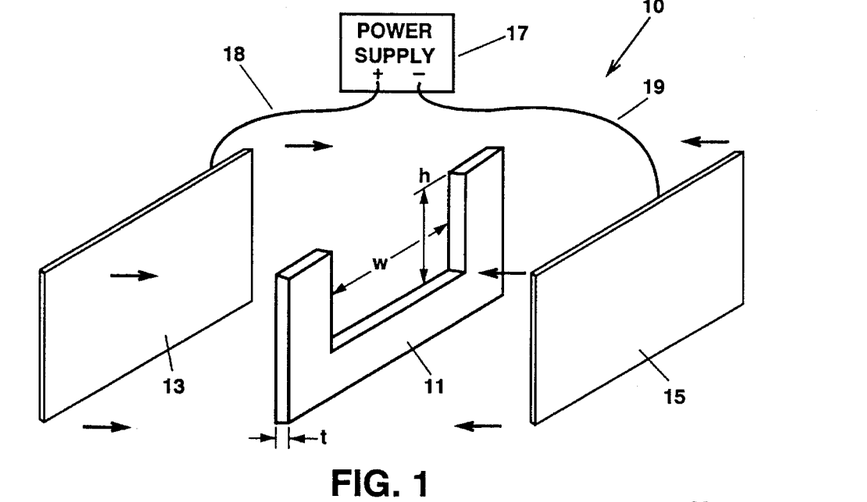
FIG. 1 is a perspective exploded view of a simple electroset mold.

In association with the data presented for the materials of example 3, several molds for electrosetting test samples were constructed generally conforming to mold 10 as shown in FIG. 1. Electroset mold 10 comprises spacer 11 and electrode plates 13 and 15. Spacer 11 is made of an insulating material, such as for example wood and plates 13 and 15 are made of conductive material, such as for example steel. High voltage power supply 17 is shown adapted to electrically energize electrode plates 13 and 15 through power wires 18 and 19, respectively. During molding, electrode plates 13 and 15 are moved into an abutting relationship with the principal faces of spacer 11 and securely retained so that molding material does not readily escape from the molding area. In acquiring the test data set out in Table 3, the electrode plates were additionally sealed to the spacer using plastic postal mailing tape manufactured by 3M Company. Additionally, for the test data shown in Table 3, spacer 11 had inside dimensions: t about 0.3 in (0.76 cm); w about 2.75 in (6.93 cm) and h about 2.15 in (5.42 cm), where t, w and h are as shown in FIG. 1. Electrode plates 13 and 15 were made of steel and had dimensions of about 3 in (7.56 cm) by 2.5 in (6.3 cm) by about 0.125 in (0.315 cm) thick. During electrosetting of the samples, mold 10 is held in a generally upright position with the open area opposite gravitational forces for convenience in pouring the uncured material into the mold.

A two part polyurethane comprising a first part resin and a second part hardener and sold under the brand name REN RP 6402 and commercially available from CIBA-GEIGY Corp. in East Lansing Michigan was mixed with powdered carbon in the form of graphite in the proportions of about 100 parts by weight of hardener; about 35 parts by weight of resin; and about 3 parts by weight carbon powder. It was observed that this mixture was a black viscous fluid. The two part polyurethane as commercially sold has a normal pot life or working time of about 30 minutes at room temperature.

The carbon powder was manufactured by Gougeon Brothers, Inc., Bay City, Mich. and sold under the West System brand name as 423 Graphite by Oceana, a marine supply company in Annapolis, Md.

After mixing a first sample of example 3 material was poured into a mold as described above after the mold had been prepared by applying a mold release to the interior of mold 10. The mold release used was product number AC-4368 sold under the Frekote brand name by the aerospace and Industrial Products Division of the Hysol Corporation in Seabrook, N.H. The electroset material fluid was poured into the mold through the open gap at the top of the mold. Naturally, in this simple mold, the open side is preferably the side opposite the force of gravity.

After pouring the mixture into the mold, the resistance of the fluid electroset material between plates 13 and 15 was made by disconnecting wires 18 and 19 from power supply 17 and connecting these wires to a Fluke multimeter as described above. A resistance of about 7.8 megohms was measured. Then the plates were again electrically connected to the high voltage power supply and energized. and the supply was set for a maximum output voltage of about 3 kv and maximum current output of 5 ma. Bubbling and foaming of the material as it electroset were observed, causing some material to be discharged from the mold. As the material hardened with continued applied electric power, the material conformed to the shape of the cavity of mold 10. After about 10 minutes, the material had electroset in place, drawing no measurable current. The plates were again electrically disconnected from the high voltage power supply. Using the Fluke multimeter, a resistance of greater than 20 megohms was measured for the electrical resistance of the end product. Similarly, a second sample of the example 3 composition was fabricated and electroset. With each of these samples, the electrical resistance of the sample was measured directly after the electroset fluid was poured into the mold and in each case the measured resistance was about 7.8 megohms. After electrosetting sample number 2 with the 3 kv maximum voltage and a 2.5 ma maximum applied current, sample 2 was measured for its electrical resistance. Using the Fluke multimeter, the resistance measured over 20 megohms. The time required for the second sample to electroset was about 15 minutes and some foaming during the electroset process was observed. The observed amount of foaming, however, was less than that noted in the fabrication of sample 1.

A third sample was fabricated in the same manner as in the first two samples. However, no high voltage was applied to the electroset material fluid, consequently the current was zero. Using the Fluke multimeter, the electrical resistance of the material was measured after setting, which required the full 30 minutes. It was found that the material resistance was over 20 megohms. No foaming was observed during the setting of sample 3. Although it is noted that all three samples achieved a resistance change from about 7.8 megohms to more than 20 megohms during the course of their cure, it is also noted that the time required for this change was a function of the cure time, that is the rate of change of resistance in the composition is proportional to the current flow in the material during the cure phase.

The samples were then removed from their molds and their specific gravity measured. The data is listed in Table 3 in association with the applied current and the cure or set time.

TABLE 3

SPECIFIC GRAVITY, COMPRESSIBILITY AND SET TIME AS FUNCTION OF CURRENT DENSITY

| Sample Number | Maximum Current ma | Specific Gravity (g/cc) | Compressibility $\Delta t/t$ | Set Time (minutes) |
|---|---|---|---|---|
| 1 | 5.0 | 0.824 | .39 | 10 |
| 2 | 2.5 | 0.919 | .25 | 15 |
| 3 | 0.0 | 1.03 | .16 | 30 |

After the density measurements were made, the samples were cut open and examined. It was found that all three samples had some voids within the material. Sample 1 had by far the most observable amount of voids. Sample 3 had the least and sample 2 had an amount less than that of sample 1 but greater than sample 3. The voids in sample 3 were observed to be appreciably smaller in both number and size in comparison to those found in samples 1 and 2. The relative amount of foaming corresponded to the relative maximum allowable current flow and subsequently to the amount of voids present in the electroset sample.

Also, an effect was observed for samples 1 and 2, the samples which were electroset, which was not observed with sample 3, the sample which was allowed to set without applying electrical current. It was noted that samples processed in accordance with sample 3 were easily separated from the electrodes after the material had set and cured. This was expected because the mold release agent had been used in the molds Just prior to pouring the electroset material fluid. The mold release worked and the finished end product sample was easily separated from its electrodes. Easy release was not the case with samples 1 and 2. Repeatedly, it was found that this example 3 composition when electroset under the conditions for samples 1 and 2 was only easily separated from one of the two electrodes. It was repeatedly observed that one of the two electrodes could be pulled off the electroset material solid (i.e. the solidified end product) by hand. The other electrode was always much more difficult to separate from the electroset material solid. The samples had to be pried off of the second electrode. This situation was not expected because it had not been encountered in the samples of examples 1 and 2. One reason for the difference may lie in a difference between the constituents of the materials. Example 1 samples were a polyester based electroset material. It is well known to those who work with polyesters that polyesters do not exhibit strong adhesion to metal surfaces. Since the electrodes were metal, the polyester samples of example 1 did not adhere to the metal electrodes. In the case of example 2 samples, the samples were epoxy based electroset materials. Epoxies are known for their adhesion to many surfaces, including metal. Because mold release was not used on the electrodes when example 2 samples were electroset, it was expected that they would adhere to the metal electrodes, as they did. In fact, a composite structure was formed each time the samples of example 2 were electroset. The composite structure comprised both of the probe electrodes and the epoxy based electroset material that had been electroset therebetween. Effort was required to remove the electrode plates from the sample core material. This usually was performed by prying off a corner of the electrode from the sample and then, while gripping that corner with pliers, pulling, peeling or yanking the electrode off. Contrastingly, no significant differences in the adhesion of example 2 samples to one electrode in preference to the other electrode was noted.

Thus the difference in adhesion, especially the preference for adhesion to one of the two electrodes, of the examples of sample 3 was surprising. In prying off the example 3 samples that had been electroset, it was often found that a thin layer of reddish purple polymer had to be ripped off of the surface of the sample in order to separate the samples from that electrode. This layer was left adhering to the electrode. In instances when this layer of polymer did not tear off from the sample but instead remained firmly attached to the bulk sample, the surface of this polymer layer was found to be smooth. It was observed that there was a significant difference in the color of this layer with respect to the rest of the bulk sample. The bulk of the electroset material solid was black except for this reddish purple layer. The difference in color was quite noticeable.

It was also found that when this reddish purple layer of polymer was observed, it always occurred on the negatively charged electrode surface. In other words, it always was found to adhere much more strongly to its adjacent electrode (i.e. the negative electrode) than did the black bulk polymer to the other electrode.

Thus, surprisingly, it was found that the electroset material samples of example 3 that had been electroset were anisotropic in both surface color and surface adhesion to the steel electrodes. This anisotropy demonstrated that a different polymer was formed on one electrode than on the electrode of opposite polarity. The reddish purple polymer layer was that color because there was little or no carbon powder particulate in it. The rest of the bulk polymer was black because it did have the carbon powder in it.

The reddish purple polymer is a different polymer from the black bulk polymer for the simple reason that its properties are different. Different polymers differ because of differences in their characteristic properties, said properties being mechanical, electrical or even optical. The reasons for the anisotropic adhesion and anisotropic optical characteristics are, at present, unclear except for the fact that they resulted from electrosetting the samples. The anisotropic properties of adhesion are useful in making end articles where it is desired that one of the electrodes become a part of the end item and the other electrode release from the end item.

Examination revealed that samples 1, 2 and 3 of example 3 varied in their relative compressibility (i.e. their squeezability). This was done by placing the samples between the fingers, squeezing hard and then noting how much the sample would compress. Sample 1 could be compressed in its thickness to about 50 percent of its origin thickness. As the fingers released the sample, the sample returned to original thickness. Using this same method, sample 2 compressed to about 75 percent of its original thickness. Sample 3, which had the least amount of voids also compressed the least. It compressed to only about 90% of its original thickness.

Subsequently, compression tests were performed using an Instron Model 1325 Servo Hydraulic Machine. For each of samples 1, 2 and 3, a 100 pound force was applied to one surface of an opposing pair of surfaces while the other surface rested against a plate. The change in thickness of the material as a result of applying the 100 pounds force was measured. The relative compressibility of the samples is indicated by the ratio $\Delta t/t$ where $\Delta t$ is the change in thickness and t is the uncompressed thickness. The results of these tests are shown in Table 3. The compressibility of the material was identified as being a function of the increasing amount of voids in the samples. The location of the voids in the example 3 samples appeared relatively uniform throughout the body of each electroset sample.

Example 4

A 500 ml quantity of an electroset composition made in accordance with the proportions of example 1 was modified by adding 150 ml of Polyurethane clear plastic coating, sold under the Channel Home Center brand name and 50 ml cornstarch. A probe of the same dimensions and construction as that used in example 1 was inserted into the mixture. The probe was then energized with the Glassman High Voltage power supply set for a maximum voltage of about 3– 5 kv and a maximum current of about 3.3 ma. The probe was then removed and it was noted that the material between the probe electrodes had solidified via the Winslow effect. After 3 to 5 minutes it was noted that the electroset material began to foam and some of the fluid expanded outward from between the electrodes and fell back into the mixture container. The remaining electroset composition between the electrode plates electroset into a solid within 2 minutes after foaming initiated.

The electroset sample was then removed from between the electrodes and broken into two pieces for the purpose of examination. It was observed that a layer of voids had formed within the sample. The distribution of the voids in this sample was observed to be anisotropic, a distinct departure from the void distribution observed in the samples of example 3. The voids were found in a layer that lay just beneath the side of the sample that had been energized with the electrode of negative polarity. On the side of the sample which was adjacent to the positive polarity electrode, there was a notable absence of voids. The same process of electrosetting this example 4 mixture was repeated several times and the same anisotropy in void distribution was observed each time.

Figure 2:
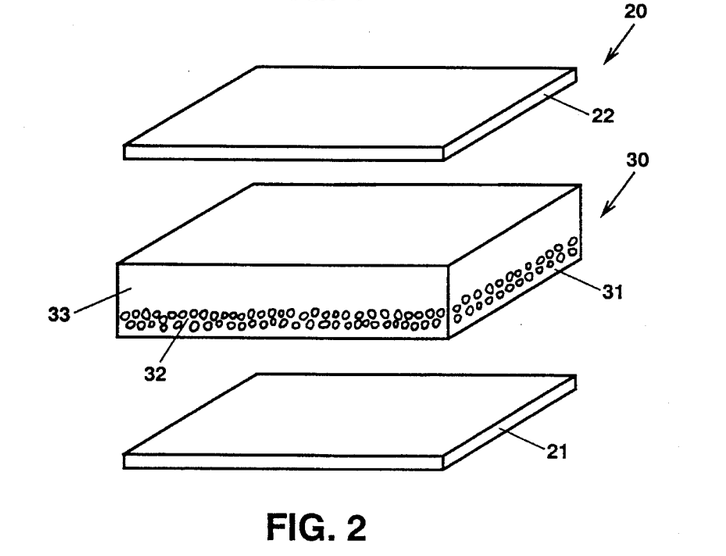
FIG. 2 is a perspective view of an electroset article showing anisotropic void distributions.

Referring now to FIG. 2, a cross section of an end product such as fabricated in accordance with the samples of example 4 is illustrated generally as 20. Two conductive surface plates 21 and 22 are shown removed from an electroset end product core section identified generally as 30. When an electroset end product composite is fabricated and conductive plates 21 and 22 are left in place, one end product is formed. When the electrode plates are removed, a second end product is formed. Electroset product 30 comprises a thin sheet of solid polymer material 31, a polymer layer 32 having voids embedded within the bulk solid, and a thicker layer 33 of bulk polymer having no voids. The thickness of thin sheet 31 was noted to be between about one third to one fourth the thickness of void bearing layer 32 and about one fourth to one fifth of the thickness of substantially solid layer 33. In the test examples that were electroset, thin sheet of material 31 was found to be about 0.020 inch (0.5 mm) thick. Polymer layer 32 containing the voids was found to be about 0.070 inch (1.8 mm) thick on average, and polymer layer 33 was found to be about 0.095 inch (2.4 mm) in thickness. The anisotropic void distribution within the sample was surprising because anisotropic layering of the voids was not observed for the compositions in example 1, 2 and 3. The layer of voids was always found adjacent to the thin layer next to the negative polarity electrode.

Causes for the anisotropic distribution of the voids are not, at present, known. However, it seems clear that it is electrical in origin due to the preferential void distribution near the negative electrode. It is also clear that the anisotropy in void is advantageously useful in the fabrication of some objects.

Figure 3:
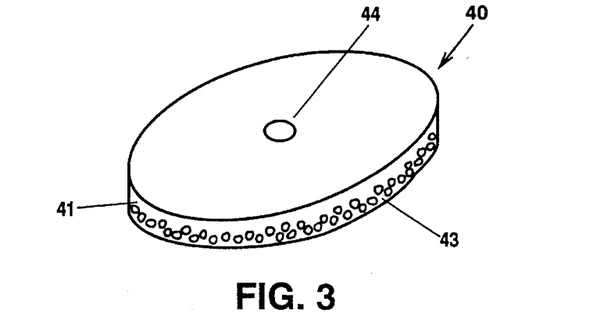
FIG. 3 is a perspective view of a sanding disk having anisotropic voids.

Referring now to FIG. 3, a sanding disk is illustrated generally as 40. Sending disk 40 comprises a first solid layer 41 and a second porous layer 43. Both first and second layers are made from a polymer which has been adapted to function as an anisotropic electroset material and are formed contemporaneously by curing the anisotropic electroset material, such as for example the compositon of Example 4, in an electric field and exposing a surface by cutting through a plurality of voids contained in such cured anisotropic electroset material. Sanding disk 40 is used in practice by rotating around a center hole 44.

Figure 4:
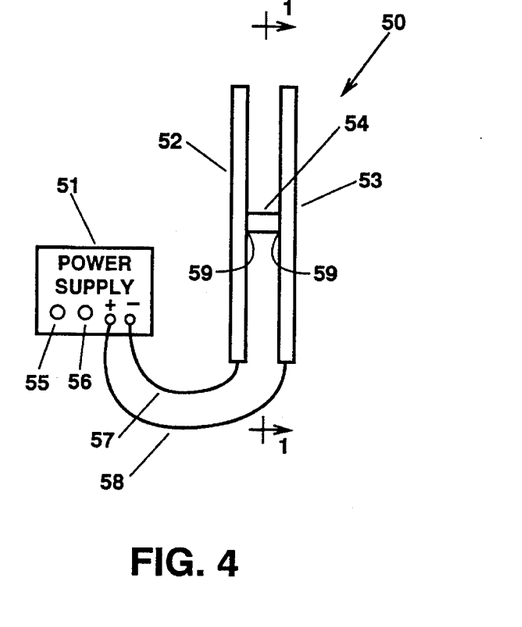
FIG. 4 is a side elevation view of a mold for making a sanding disk.
Figure 5:
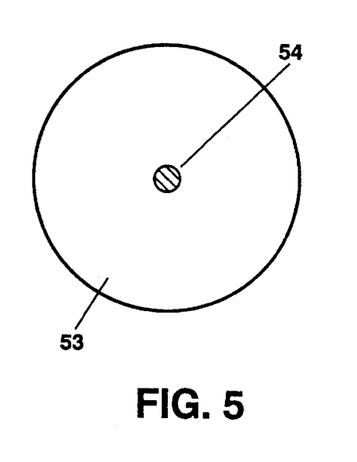
FIG. 5 is a section view of the mold shown in FIG. 4 taken along the line indicated by 1—1 in FIG. 4.
Figure 6:
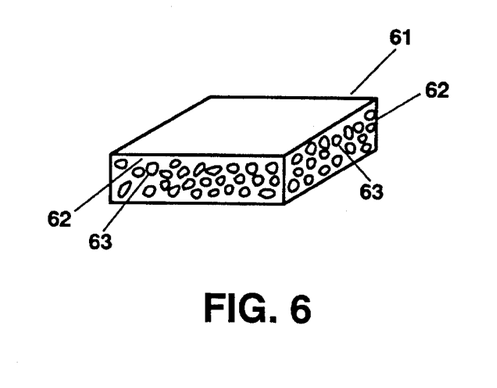
FIG. 6 is a perspective view of an anisotropic electroset insert for a shoe sole.

A sanding disk of about 5.25 inch (13.2 cm) was fabricated from the electroset composition described in example 4 by using an electric mold 50 as shown in FIG. 4. Electric mold 50 comprises conductive disks 52 and 53 generally circular as shown in FIG. 5 and spaced apart from each other by means of insulating right circular cylinder 54. Power supply 51 is a high voltage power supply having a current limit control 55 and a voltage limit control 56. Power supply 51 is electrically connected to circular disks 52 and 53 via electrical connections such as for example wires 57 and 58. Conductive disks 52 and 53 are made of a suitable material such as for example, aluminum or steel. Cylinder 54 is made from a suitable insulating plastic such as for example, Lexan. Wires 57 and 58 may comprise copper, steel or aluminum.

In the model constructed, the height of cylinder 54 was about 0.3 (7.6 mm) inches and the diameter of cylinder 54 was about 0.25 (6.4 mm) inches. Cylinder 54 was adhesively attached to disks 52 and 53 using Weatherguard Brand silicone sealant (clear C-910) applied as indicated by 59. The adhesive was applied to the top and bottom surfaces of cylinder 54 and then pressed onto disks 52 and 53. The adhesive was permitted to harden over a 48 hour period. Disks 52 and 53 were made of aluminum and were both about 5.25 inches (13.2 cm) in diameter and about 0.125 inches (3.2 mm) in thickness.

After the silicone sealant was permitted to harden, disks 52 and 53 were electrically connected to the positive and negative terminals respectively of the Glassman high voltage power supply. The mixture of example 4 was made and poured into a plastic container. Mold 50 was immersed in the mixture such that fluid mixture filled the gap between electrode disks 52 and 53. Electric power was then applied to disks 52 and 53 using the Glassman high voltage power supply. The power supply was set to deliver a maximum applied voltage of 4 kv and a maximum applied current of 8 ma. Mold 50 was then removed from the mixture and placed on an insulating table. It was observed that electroset mixture filled the space between electrode disks 52 and 53 and that the material had solidified via the Winslow effect. After 5 minutes, it was observed that the electroset material began foaming between the electrodes and some of the electroset fluid poured out onto the table. After an additional 3 minutes, it was observed that the remaining electroset material between electrodes 52 and 53 had electroset and solidified via the second Reitz effect. Electric power to the mold was then turned off. The mold was hot to the touch and for this reason mold 50 was permitted to cool for 30 minutes.

After cooling, disks 52 and 53 were removed by physically tearing the silicone sealant. A plurality of voids on the surface of porous layer 43 was exposed by cutting through the voids. Thus, sanding disk 40 comprising the solidified electroset mixture was removed from the electrode disks 52 and 53. Cylinder 54 was removed from the center of the sanding disk thereby creating a hole in the center of the sanding disk. A threaded rod was inserted into the center hole of the sanding disk and then attached thereto. It was observed that one side of the disk was appreciably rougher than the other side. The rough side was found to be the negative electrode side of the disk. The sanding disk was then attached to a hand drill with rough side facing away from the hand drill. Using the hand drill, it was observed that the sanding disk was effective in sanding down the surface of a yellow pine board.

Advantages of fabricating sanding disks in this manner are numerous. First, the sanding disks can be fabricated quickly once the mold has been prepared. Second, the 0.3 inch (7.6 mm) sanding disks were found to last longer than sandpaper sanding disks available at a local hardware store. Finally, since the shape of the sanding disks conform to the shape of the electric mold, the sanding disks do not, therefore, need to be cut into a circular shape as do some sand paper materials before they can be used in rotary sanding.

The process of electrosetting a sanding disk is an example of the usefulness of electrically programming into the electroset material the anisotropic distribution of voids resulting in a roughened surface on one surface of the sanding disk but such process is also an example of electroshaping articles, generally. Other shapes of sanding disks and other articles generally can be readily formed by appropriately shaping the molding electrodes.

Figure 7:
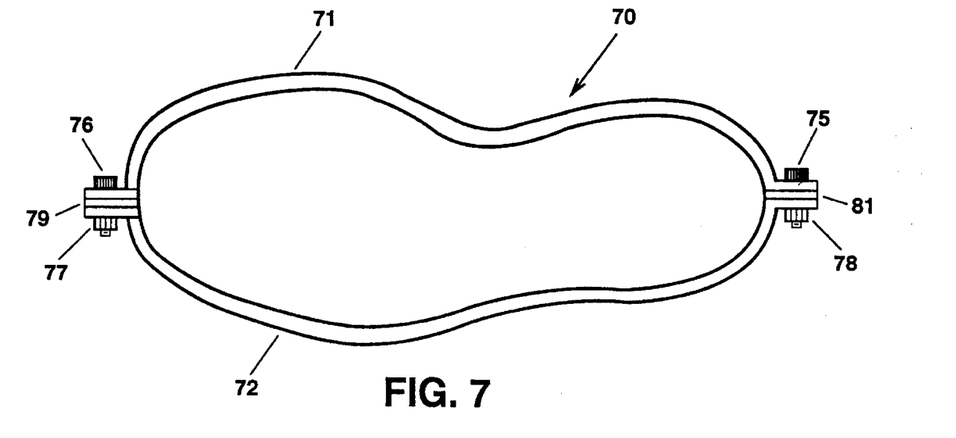
FIG. 7 is a plan view of a mold for making a shoe sole.
Figure 8:
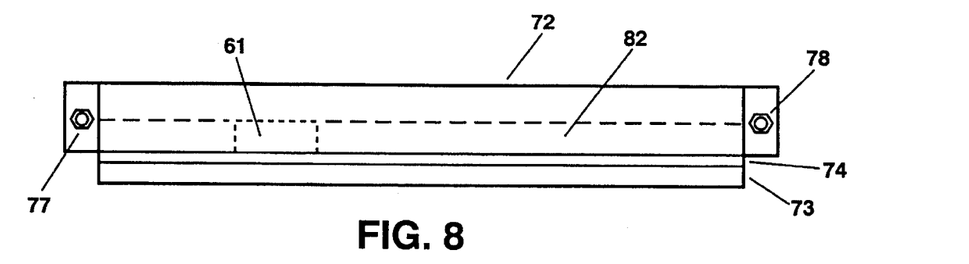
FIG. 8 is a side elevation view of the mold shown in FIG. 7, shown with a shoe sole with insert cast in the mold.
Figure 9:
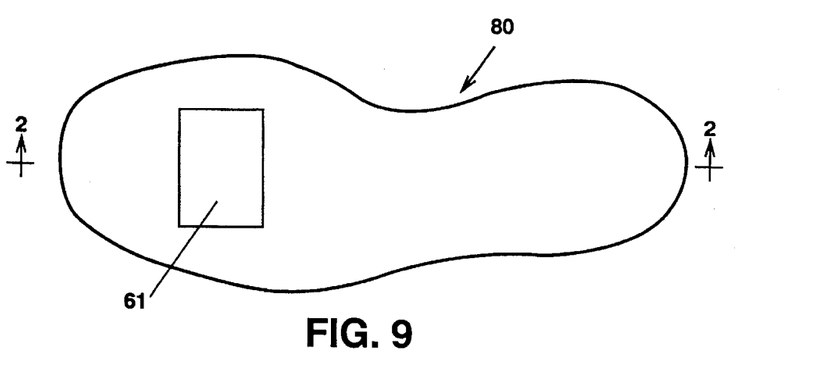
FIG. 9 is a plan view of a shoe sole.
Figure 10:
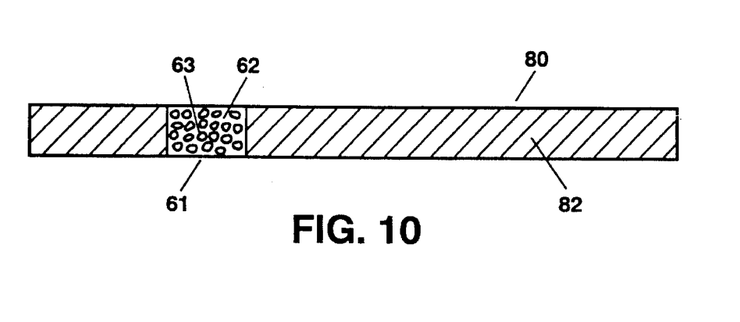
FIG. 10 is a section view of the shoe sole of FIG. 9 taken along line indicated by 2—2 in FIG. 9.

Another example of the usefulness of programming end product properties is in the making of composite articles. Using electrically programmable materials, different parts of the same article are made with different product characteristics from the same material by processing the different parts differently. For example, a sole may be made for a shoe wherein one part of the sole, such as for example the area under the bail of the foot, the arch or the heel, is desired to be of a different compressibility than the remainder of the sole. One method of making such a shoe sole is to first make an insert of one compressibility by electrosetting a material at a relatively high current setting and then casting this insert into a material that is either electroset at a different rate or allowed to cure normally. A typical apparatus for making a shoe sole first by making an electroset insert and then casting this insert in a mold to cure normally is shown in FIGS. 7 and 8 and a typical shoe sole made with at least one insert area is illustrated in FIGS. 9 and 10. Referring now to FIGS. 6–10 materials mixed in accordance with example 3 are first electroset in a separate mold forming insert 61. Insert 61 is preferably an electroset material comprising a compressible polymer end product. Insert 61 comprises bulk solid material 62 having voids 63 embedded therein. A suitable material is an electroset material processed as described in Example 3 above. After fabricating insert 61, a completed shoe sole 80 as shown in FIG. 9 and FIG. 10 is then fabricated by placing insert 61 in a suitable mold and pouring additional material 82 around the insert. By processing additional electroset material 82 differently, a different compressibility for the additional electroset material 82 is established.

Referring now to FIG. 7, a mold for making shoe soles is indicated generally as 70. Mold 70 comprises side pieces 71 and 72 which are, in the form illustrated, conveniently held together by suitable means such as for example, bolts 75 and 76, and nuts 77 and 78. Bolts 75 and 76 and nuts 77 and 78 are made of any suitable material such as steel. Other forms of retention of the mold pieces such as clamps are also usable. Gasket 74 is interposed between mold side pieces 71 and 72 and mold bottom 73. Mold side pieces 71 and 72, mold bottom 73 preferably comprise an easily workable material such as for example wood. Gaskets 79 and 81 are of a suitable thickness and material such as for example, ⅛ inch thick silicone rubber. Gasket 74 is also of suitable material and thickness such as for example, ⅛ inch thick sheet silicone rubber, and has the same cross sectional dimensions as those of mold bottom 73. Mold bottom 73 is also made of a suitable easily workable material such as for example, wood.

In practice, gasket 74 is placed onto mold bottom 73. The outer edges of gasket 74 are then smeared with a suitable grease, such as for example, Dow Corning High Vacuum Grease. Only the side of gasket 74 that faces away from mold bottom 73 is smeared with grease. After the outer edge of gasket 74 has been smeared with grease, side pieces 71 and 72, with silicone rubber pieces 69 and 71 positioned in between as shown in FIG. 8, are retained together. Mold pieces 71 and 72 are then pressed onto the greased outer edges of gasket 74 which rests on mold bottom 73. Afterward, electroset insert 61 is placed on gasket 74 as shown in FIG. 7. Once insert 61 is positioned in mold 70, an electroset mixture such as for example a mixture of example 3 is formulated and poured into the mold. The mixture is poured so that the thickness of this mixture of fluid is equal to the thickness of insert 61. The mixture is then permitted to set and cure, adhering to the edges of insert 61, thus comprising a shoe sole 80 with a compressible insert as 61 as shown in FIGS. 9 and 10. Shoe sole 80 can now be sewn together with other materials to comprise a shoe.

It is appreciated that many other shoe mold designs can be employed without departing from the scope of the present invention. It is further appreciated that many other products can be fabricated in accordance with the present invention without departing from its scope.

Figure 11:
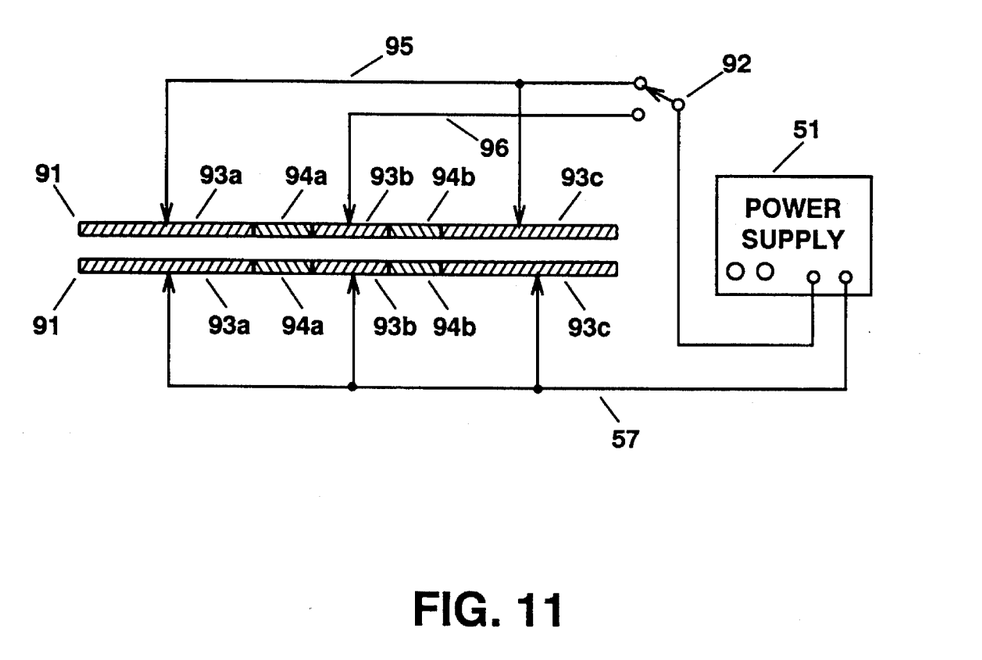
FIG. 11 is a section view of a mold for making an electroset article with a diverse densities.

One aspect of varying the density or compressibility of a material electrically is that different areas or zones of an integral piece of material or of an object can be caused to have different different densities or compressibilities while only mixing one basic composition. An example of an apparatus for achieving different areas or zones of physical properties by electrical programming is shown in FIG. 11. Power supply 51 is shown with one terminal electrically connected to one mold surface 91 via electrical connections 57 and with the other terminal connected to a current distribution device such as for example switch 92. Mold surfaces 91 comprise conductive areas 93a, 93b and 93c and insulating regions 94a and 94b. Switch 92 is actuated to sequentially or alternately apply power to conductive areas 93a and 93c and then to conductive area 93b. An electroset mixture such as for example that disclosed in example 3 is placed between plates 91 and power supply 51 is energized. Current may then be applied through the composition adjacent areas 93a and 93c at a rate and time different from the rate and time current is applied through the composition adjacent areas 93b, thus forming an integral solid having different physical properties such as density or compressibility in different areas of the solid.

Examples 1, 2, 3 and 4 are examples of electroset materials that have electrically programmable and electrically controllable material properties. These controllable and programmable material properties include mechanical and electrical properties. The electroset process generally is usable for fixing the position and alignment of various aggregates in an electroset material. Two such aggregates as are also useful in electroset compositions are disclosed in Examples 5 and 6 set out below.

Example 5

A mixture was made of 30 ml of 50 cs Dow Corning dimethyl silicone, 30 ml of General Electric silicone rubber sealant and 30 ml of cornstarch to which had previously been added 1 ml of water and 1 ml of piezoelectric crystal powder in an insulating container. The silicone rubber sealant is sold under the brand name Silicone II and the piezoelectric powder comprises piezoelectric crystal which was obtained from several transducers and which was pulverized with a hammer. The nomenclature for the piezoelectric crystal material is PZT-5 and was taken from transducers available from the Vernitron Corp. Piezoelectric Div. located in Bedford, Ohio.

After mixing thoroughly, a probe with the same dimensions and construction as that described in example 1, was immersed within the mixture. A 6 kv potential was applied to the probe electrodes and then the probe was removed from the container. It was observed that the material between the probe electrodes had solidified via the Winslow effect. After 15 minutes the electric power supplied to the probe by means of the Glassman high voltage power supply was removed. It was observed that the material had electroset. The remaining mixture was permitted to stand in a room environment and was observed to have not set, even after a period of 24 hours had passed.

The causes of the accelerated set and cure rates of the mixture in this example are not conclusively known. However, it may be postulated that the water contained in the cornstarch particles may be activated with the applied electric field. There is supporting evidence for the validity of this postulate. The first supporting evidence is that, it is known that silicone rubber materials of the type such as that used in household sealants are typically cured, not by exothermic means, but instead by means of chemical interaction with water. Other evidence includes the fact that, when the mixture in this example is electroset, the material sets thoroughly throughout rather than just on the surface of the sample. Since water is necessary for the silicone rubber to set and cure, it must have origins from inside the mixture because of the thorough nature of the setting. Yet, this same mixture, when left for a period of 24 hours did not set on its own. It may therefore be concluded that applying the electric field to the sample causes the water that was initially mixed in with the cornstarch particles to come out of the cornstarch particles. This may be a result of local heating generated as current is applied to the material and the water in the cornstarch particles subsequently expands.

This mixture is an example of the present invention that, at present, is not known to cure by an exothermic reaction resulting from chemical interaction of constituent compounds. This example is also an example wherein electrogenerative particles, such as the piezoelectric powder, can be embedded in a polymer via the second Reitz effect.

The following example also is an example of embedding photoelectrogenerative particles. However, in that example, the electrogenerative particles comprise photovoltaic particles.

Example 6

A mixture was made comprising 30 ml Silicone II rubber sealant and 30 ml of 50 cs Dow Corning dimethyl silicone oil was added to 30 ml of cornstarch to which previously had been added 1 ml of water and 1 ml of photovoltaic powder. The photovoltaic powder was fabricated by grinding up several silicon solar cells by means of a grinding wheel. The silicon solar cells used were purchased at a local electronics store in Hyattsville, Md. and are sold under the Archer brand name and with the catalog number 276-124.

A probe having the same dimensions and construction as the one used in example 1 was immersed in the mixture. A 6 kv potential was applied to the probe electrodes and then the probe was removed from the mixture. It was observed that the material between the probe electrodes had solidified via the Winslow effect. After 15 minutes the electric power supplied to the probe by means of the Glassman high voltage power supply was removed. It was observed that the material had electroset. The remaining mixture was permitted to stand in a room environment and was observed to have not set, even after a period of 24 hours.

Materials that have been formed from electroset compositions using the electroset process have unique properties. As a result of the aggregate particles aligning along the electric lines of flux, it is observed that often the resulting electroset article has aligned columns of material embedded in the cured material. In some compositions, the alignment is visible with the unaided eye. Such alignment is useful in identifying materials that have been produced through the use of the electroset process. Other potential means of identifying such articles may be found, such as for example, identification of trace poylmers that are produced only when the material is cured in the presence of a field. Such identification may include the use of infrared spectroscopy and nuclear magnetic resonance (NMR) detection and mapping. Electroset articles having a (polymer-particulate-polymer-particulate-polymer . . . ) structural periodicity that can be mapped using NMR and other detection means can be identified as having been made using the electroset process. Other detection means, such as for example, X-ray defraction, Bragg reflection mapping and electron defraction may also prove useful in detecting the periodicity characteristics.

It is appreciated that there are many other electroset compounds and mixtures that can be made to have electrically programmable and electrically controllable physical properties. Material properties such as electrical resistivity, density, hardness, adhesion and compressibility are all electrically controllable by means of the present invention. It is further appreciated that many uses of the present invention can be employed to render desirable results. Such uses include, but are not limited to, the commercial production of shoes and sanding disks and the fast fabrication of replacement parts and also prototype objects. It will be appreciated in the light of this disclosure that many other kinds of electroset materials with electrically programmable and electrically controllable properties may be used without departing from the scope or spirit of the present invention. It is to be understood that the embodiments herein described are only illustrative of the application of the principles of the invention and that numerous modifications, alternative embodiments and arrangements may be readily devised by those skilled in the art in the light of this disclosure without departing from the spirit and scope of the invention. It is to be understood that within the scope of the appended claims, the invention can be practiced otherwise than as specifically described herein.

What is claimed is:

1. A process for curing an electroset composition so as to alter at least one end-product property selected from the group of end-product properties consisting of density, compressibility, hardness, and buoyancy, said process comprising:

providing a quantity of said electroset composition, in an uncured state, said electroset composition comprising a phase changing vehicle which is both a dielectric and a polymer and an aggregate comprising particles which will polarize in an electric field;

positioning said electroset composition between at least two electrically conductive substrates;

charging said electrically conductive substrates, thereby exposing said electroset composition to a said electric field; and maintaining said charging so as to establish an electric current within said electroset composition;

whereby said electroset composition, in a cured state, has at least one said end-product property which is altered by at least 5% with respect to that said end-product property which would be obtained for said electroset composition, in a cured state, by a process for curing said electroset composition which does not include said charging; and whereby said alteration is a function of the amount of said current within said electroset composition.

2. A process for altering a physical characteristic of a cured electroset article, said physical characteristic selected from the group of physical characteristics consisting of density, compressibility, hardness, buoyancy, smoothness, adhesion and shape, said process comprising:

providing an uncured electroset material having an electrically activated blowing agent dispersed therein; and curing said electroset material in an electric field sufficient to activate said blowing agent;

whereby, for said physical characteristic being selected from the group of physical characteristics consisting of density, compressibility, hardness, electrical resistivity and buoyancy, said altering is a function of the amount of said current within said electroset composition;

whereby, for said physical characteristic being selected from the group of physical characteristics consisting of smoothness and adhesion, said altering is an anisotropic function of said positioning of said electroset composition with respect to said electrically conductive substrates; and whereby, for said physical characteristic being shape, said positioning includes placing said electroset composition in an electric mold which includes said electrically conductive substrates, and said altering is a function of the configuration of said electric mold.

3. A process for curing an electroset composition as in claim 1, wherein said end-product property is density.

4. A process for curing an electroset composition as in claim 1, wherein said end-product property is compressibility.

5. A process for curing an electroset composition as in claim 1, wherein said end-product property Is hardness.

6. A process for curing an electroset composition so as to alter at least one end-product property selected from the group of end-product properties consisting of smoothness, adhesion and shape, said process comprising:

providing a quantity of said electroset composition, in an uncured state, said electroset composition comprising a phase changing vehicle which is both a dielectric and a polymer and an aggregate comprising particles which will polarize in an electric field;

positioning said electroset composition between at least two electrically conductive substrates;

charging said electrically conductive substrates, thereby exposing said electroset composition to a said electric field; and maintaining said charging so as to establish an electric current within said electroset composition;

whereby said electroset composition, in a cured state, has at least one said end-product property which is altered by at least 5% with respect to that said end-product property which would be obtained for said electroset composition, in a cured state, by a process for curing said electroset composition which does not include said charging;

whereby, for said end-product property being selected from the group of end-product properties consisting of smoothness and adhesion, said alteration is an anisotropic function of said positioning of said electroset composition with respect to said electrically conductive substrates; and whereby, for said end-product property being shape, said positioning includes placing said electroset composition in an electric mold which includes said electrically conductive substrates, and said alteration is a function of the configuration of said electric mold.

7. A process for curing an electroset composition as in claim 6, wherein said end-product property is smoothness.

8. A process for curing an electroset composition as in claim 6, wherein said end-product property is adhesion.

9. A process for curing an electroset composition as in claim 6, wherein said end-product property is shape.

10. A process for curing an electroset composition as in claim 1, wherein said end-product property is buoyancy.

11. A process for curing an electroset composition as in claim 1, wherein said electroset composition is electrically semiconductive.

12. A process for curing an electroset composition as in claim 1, wherein said electroset composition is capable of conducting an electric current density of at least 0.667 milliamps per square inch.

13. A process for curing an electroset composition as in claim 1, wherein said electroset composition has a resistivity of less than about 290,000 ohm-meters.

14. A process for curing an electroset composition as in claim 1, wherein said electroset composition is capable of liberating a gas upon said exposure of said electroset composition to said electric field.

15. A process for curing an electroset composition as in claim 1, wherein said particles are electrorheological particles.

16. A process for curing an electroset composition as in claim 1, wherein said phase changing vehicle is capable of liberating a gas upon exposure to said electric field.

17. A process for curing an electroset composition as in claim 1, wherein said electroset composition is capable of liberating a gas upon exposure to said electric field.

18. A process for curing an electroset composition as in claim 1, wherein said electroset composition, in a cured state, comprises a three dimensional object having three axes and voids anisotropically distributed along one said axis of said object.

* * * * *